United States Patent Office 3,532,508
Patented Oct. 6, 1970

3,532,508
TREATMENT OF RICE
Mariette Ott, Zevenaar, Netherlands, assignor to Lever Brothers Company, New York, N.Y., a corporation of Maine
No Drawing. Filed Apr. 23, 1968, Ser. No. 723,583
Claims priority, application Netherlands, May 10, 1967, 6706507
Int. Cl. A23b 7/00
U.S. Cl. 99—80                          9 Claims

ABSTRACT OF THE DISCLOSURE

In a process for preparing sterilised rice or rice dishes in containers, uncooked rice grains are preheated at a high temperature in the substantial absence of water, transferred to a sealable container together with water and optionally together with other ingredients as required, the container is sealed and the contents of the container heat-sterilised within the container.

---

The invention relates to a process for the preparation of sterilised rice and rice dishes in containers and to sterilised rice and rice dishes thus obtained.

When preparing cooked or sterilised rice by heating raw, non-pretreated rice in the presence of water, the rice tends to become pasty and sticky. This is especially the case when manufacturing sterilised rice, which may optionally be mixed beforehand with other ingredients, such as meat, vegetables, herbs and condiments, so as to obtain precooked and sterilised rice dishes, such as nasi goreng, risotto, paella, pilaf and curry rice, the main problem being to prepare these dishes in such a way that the rice is loose-grained and has an acceptable colour and taste.

We have now found that it is possible to prepare sterilised rice or rice dishes in containers having a loose or fluffy character and of excellent consistency and taste, by pretreating the rice in a special manner before sterilisation in a sealed container such as a can.

Accordingly, the invention relates to a process for the preparation of sterilised rice or rice dishes in containers which comprises the steps of preheating in the substantial absence of water uncooked rice in an inert liquid medium or in a gaseous medium and subsequently sterilising the preheated rice, optionally together with other ingredients, in a sealed container.

More particularly, it has been found that sterilised rice or rice dishes of excellent consistency and taste with loose, non-sticky grains may be prepared by preheating uncooked rice in an inert liquid medium or a gaseous medium to a temperature of from 140° C. to 250° C., for a period of time to ensure that the rice grains are not superficially sticky after subsequent sterilisation in the container.

A suitable period of time for preheating is dependent on the temperature applied, on the method of heating employed and to a lesser extent on the type of rice used. The rice which forms the starting material may be husked or unhusked, optionally polished rice.

The time and temperature of preheating may be from 10 seconds at a temperature of 250° C. to 30 minutes at a temperature of 140° C. Too high a temperature may impart an undesirable colour or taste to the sterilised rice, especially if that temperature is maintained for too long a period.

The rice grain that is used as starting material according to the invention, is conveniently that having a moisture content of 12% to 15% by weight, which is normal for raw rice grains. However, rice with a moisture content of from 1% to 20% by weight may be used as starting material. In general, the moisture content of the rice to be treated accordance to the invention is therefore of little importance in obtaining sterilised loose-grained rice or rice dishes, provided that it is within these limits as broadly defined. Thus, for example, it has been shown by experiment that rice which has been moistened to a water content of 20%, or rice that has been dried in the usual way or faster than usual, for example at about 60° C., to a moisture content of 3%, and which had been treated subsequently according to the invention, may give a sterilised product of excellent quality. There may however be a tendency for high moisture content rice grains to fragment during the treatment according to the invention.

The observation that the superficial stickiness of the rice grains subsequent to sterilisation is substantially absent is a surprising observation, since it was expected that the heating necessary to achieve sterilisation, which is more intensive than that required to cook the rice, would have resulted in an over-processed sticky product. In practice, however, a loose or fluffy rice of excellent appearance and of particularly good taste may be obtained, even with an inferior starting material such as glutinous rice.

Raw untreated rice is generally considered to be over-processed when it is cooked for more than 30 minutes at 100° C., or for 15 minutes at 110° C., or for about 7 minutes at 120° C. In order to achieve sterilisation, the rice should be heated for as much as two hours at 120° C. It is therefore all the more surprising that a loose-grained product is obtained after such excessive heating.

We have also found that when preheating the rice according to the invention, the rice grains may thereby be dried to a certain extent. If, however, preheating takes place without appreciable drying, sterilised rice or rice dishes of an even better quality will sometimes be obtained.

Preheating according to the invention may take place in a liquid medium, such as a hot edible oil or a hot molten fat, such as hot groundnut oil, soybean oil, beef suet and the like.

The preferred preheating conditions in oil are within the range from 30 seconds at 190° C. to 2 minutes at 170° C. Particularly favourable results have been obtained by immersing polished unwashed rice in groundnut oil at 180° C. for 1 minute.

In Table 1, examples of the time and temperature of preheating are given for groundnut oil, in which a layer of rice of about 1 cm. thick, the rice having a moisture content of about 13%, was immersed in hot oil.

TABLE 1

| Temperature of the oil in ° C. (approx.): | Heating time in minutes |
|---|---|
| 150 | 4–6 |
| 160 | 2–4 |
| 170 | 1–2 |
| 180 | ½–1 |
| 190 | ½ |

The upper limit of the temperature to be applied is dependent on the stability of the oil at this high temperature. Lower temperatures are of course applicable, but then there may be a tendency for the grains to fragment, especially when their moisture is higher than normal.

Another way of preheating the rice grains is with hot air or other gaseous media, such as nitrogen, carbon dioxide or super-heated steam which is particularly suited to the preparation of rice free from added oil. Hot air is however preferred for economic reasons.

When carrying out the heating with air, especially at high temperatures, the air is preferably passed through the rice at a rate of approximately 2 to 3 m. per second in an upward direction in such a way that the rice grains are maintained in the form of a fluidised bed, each grain being subjected to a similar intensive heating.

In Table 2, a range of values are provided by way of example to illustrate drying conditions using the hot air fluidise bed principle.

TABLE 2

| Temperature air, °C | 180 | 200 | 200 | 220 | 220 | 240 |
|---|---|---|---|---|---|---|
| Speed air m./sec. | 2-3 | 2-3 | 2-3 | 2-3 | 2-3 | 2-3 |
| Load kg./m.² | 4.5 | 4.5 | 13.5 | 4.5 | 13.5 | 4.5 |
| Heating time, sec. | 60-100 | 40-80 | 80-200 | 20-60 | 50-200 | 10-40 |

Particularly good results were obtained when preheating with air at 200° C. to 220° for from 20 to 80 seconds.

According to a special embodiment of the invention, the rice is heated in a thin layer with infra-red radiation. It is desirable that the rice be kept in motion as much as possible, in order to obtain uniform preheating.

According to a further embodiment of the invention, preheating takes place in a fluidised bed in the presence of salt crystals.

According to yet another embodiment of the invention, the rice is preheated dielectrically.

It will be apparent that practically any method of preheating is suitable, provided that the surface of the rice grains are brought quickly and uniformly to a temperature of from 140° C. to 250° C.

The rice thus treated according to the above-mentioned preheating processes is now sterilised.

This sterilisation may take place in sealed containers, such as cans, in the usual manner. Thus, for example, the preheated rice may be precooked in water for a short time, until the desired amount of water has been absorbed or until the product has obtained the desired softness, and subsequently dispensed or dosed, optionally mixed with other ingredients, into containers.

The sealed containers may then be sterilised without agitation in the usual way. If the containers are filled with dry rice, optionally mixed with other ingredients, as well as with a suitable amount of water to ensure adequate cooking, they should preferably be agitated for example at from 3 to 10 r.p.m. in such a way that substantially all the rice grains are uniformly rehydrated during sterilisation, in order to obtain the desired loose-grained property of the rice or rice dish.

In a particularly preferred embodiment of the invention, sterilisation takes place with rotation, the containers being initially filled with non-precooked rice, which has been preheated according to the invention, cold water and optionally together with other ingredients, a suitable head space being provided to ensure adequate mixing. The rice, as well as the mixture of rice and other ingredients is conveniently in a suitably dry state to facilitate mechanical dispensing and dosing thereof into the cans.

By a suitable choice of process conditions, such as the rate of rotation, the head space within the container, the rate at which the containers are heated, it is possible to heat the contents of the containers at such a rate that the required sterilisation temperature of the product has been reached throughout the contents of the containers, before sufficient water has been absorbed by the rice to render the container contents non-fluid. During sterilisation, the containers may be rotated in any suitable manner. Cylindrical cans are for example conveniently rotated end over end or by spinning about their longitudinal axes. The containers may be rotated at from 5 to 150 r.p.m., preferably from 40 to 80 r.p.m., dependent on the circumstances, during the warming up period until the sterilisation temperature has been reached. As soon as the whole contents of the cans have reached the desired sterilisation temperature, the rate of rotation may conveniently be decreased to for example from 1 to 3 r.p.m. If desired, rotation may be stopped during that period. During cooling after sterilisation, the cans may be rotated at from 1 to 3 r.p.m. Continuation of heating necessary for sterilisation of the contents of the cans and during cooling may however be favourable for obtaining loose-grained rice or rice dishes. It is preferred that rotation when applied is continuous, but favourable results may also be obtained by applying intermittent rotation.

EXAMPLE 1

Unwashed, air-dry Siam Patna rice was kept in hot arachis oil of 180° C. for 1 minute. After draining and completely cooling, 230 g. of this rice were filled in a can of 102 x 118.5 mm., together with 330 g. of water and 170 g. of risotto-sauce consisting of chicken meat, vegetables, flavourings, herbs and condiments. Subsequently sterilisation took place while rotating, the sterilisation conditions being chosen such that the sterilisation temperature was reached before the rice had swollen. The sterilisation conditions were:

Temperature of the steam—125° C.
Warming-up time of the autoclave—2 minutes
Rotation (around a horizontal transversal for the first 4 minutes)—70 r.p.m.
Rotation during cooling—1 r.p.m.
Distance from the centre of the can to the rotation axis approximately—10 cm.
Sterilisation time—2+9 minutes
Cooling time—45 minutes The risotto sterilised in this way had a very good taste and a fluffy, loose consistency, even in a cold state. This enabled the warming-up of the contents of the can in a pan with occational stirring.

EXAMPLE 2

The rice was heated in oil as described in Example 1. This rice was mixed with vegetables, herbs, condiments and flavouring substances in a dry state and cubes of precooked chicken meat. This mixture was so dry that the cans could be filled mechanically. A can of 102 x 118.5 mm. was filled with 340 g. of this mixture and water was added to 700 g. Subsequently the cans were sterilised while being rotated as described in Example 1.

EXAMPLE 3

Unwashed glutinous rice having a moisture content of 13% was kept in hot oil of 160° C. for 3 minutes. After draining and cooling of the rice the tins were filled and sterilised in the same way as described in Example 1.

EXAMPLE 4

Parboiled rice was heated in oil of 170° C. for 1 minute. After draining and cooling the rice was sterilised in the same way as described in Example 1.

EXAMPLE 5

Siam Patna rice was heated with hot air of 200° C. for 60 seconds. The load was 4.5 kg./m.² and the air had a speed of 2 to 3 m./sec., so that the rice grains were in a fluidised condition. The rice thus heated was used to make risotto in cans in the same way as described in Example 1.

EXAMPLE 6

Unwashed glutinous rice was heated in air of 180° C. for 60 seconds at a load of 4.5 kg./m.². The velocity of the air was 2 to 3 m./sec. This rice was used for the preparation of risotto in cans as described in Example 1.

EXAMPLE 7

Unwashed Siam Patna rice was heated in hot groundnut oil of 170° C. for 2 minutes. After draining, 225 g. of the thus treated rice was blanched in boiling water for 8 minutes to a weight of 535 g. The blanched rice was mixed with 165 g. of sauce consisting of chicken meat, vegetables, herbs, condiments and flavouring substance. This mixture was filled in a can of 102 x 118.5 mm. and sterilised in steam at 118° C. for 1¾ hours. The rice dish thus sterilised had an excellent loose consistency.

EXAMPLE 8

Blue Bonnet rice, unwashed, with a moisture content of 10%, was heated in a fluidised condition by means of an upwardly directed current of air of a velocity of about 2.5 m. per second, at a temperature of 220° C. for 40 seconds. After cooling 215 g. of this rice was filled in a can of 102 x 118.5 mm. and mixed with 170 g. of sauce and 310 g. of water. Sterilisation took place in steam at 118° C. in a hydrostatic steriliser for 2 hours; during the sterilisation process the can was turned 12 times a half turn around its longitudinal axis.

EXAMPLE 9

Unwashed Siam Patna rice was heated with hot air of 220° C. for 60 seconds. The load was 13.5 kg./m.$^2$ and the velocity of the air 2 to 3 m./sec. The rice thus heated was used to make a risotto in cans in the same way as described in Example 7.

EXAMPLE 10

Unwashed, air-dry glutinous rice was heated in hot air of 200° C. for 100 seconds. The load was 13.5 kg./m.$^2$ and the velocity of the air 2 to 3 m./sec. In the same way as described in Example 7 a risotto in cans was prepared. The risotto thus sterilised had a good taste and an excellent loose, fluffy consistency.

On the other hand a risotto which had been prepared with untreated glutinous rice was a pasty mass after sterilisation.

What is claimed is:

1. A process for the preparation of sterilised rice which comprises the steps of:
   (i) preheating uncooked rice grains in a substantially non-aqueous inert medium at a temperature from about 140° C. to about 250° C. for a period of time of about 10 seconds to 30 minutes,
   (ii) transferring the preheated rice together with water to a sealable container,
   (iii) sealing the container, and
   (iv) subsequently heat sterilising the rice in the sealed container.

2. A process according to claim 1, which comprises preheating the uncooked rice grains with an edible oil or fat.

3. A process according to claim 2, wherein the preheating temperature of the oil or fat is from about 170° C. to about 190° C. and the period of heating is about 30 seconds to about 2 minutes.

4. A process according to claim 1, which comprises preheating the uncooked rice grains with an inert gas.

5. A process according to claim 4, which comprises preheating the uncooked rice grains with hot air in the form of a fluidised bed.

6. A process according to claim 4, wherein the preheating temperature of the gas is from about 200° C. to 220° C. and the period of heating is about 20 seconds to about 80 seconds.

7. A process according to claim 1, which comprises subjecting the rice to agitation during the heat sterilisation step.

8. A process according to claim 1, wherein the preheated rise is precooked before sterilisation.

9. A sterile rice product comprising a sealed container and fully hydrated sterile loose grained rice in said container, which is produced by the process of claim 1.

References Cited

UNITED STATES PATENTS

| | | | |
|---|---|---|---|
| 2,064,701 | 12/1936 | Stokkeby | 99—80 |
| 2,185,054 | 12/1936 | Dils | 99—80 |
| 2,292,431 | 8/1942 | Coan | 99—186 |
| 2,334,665 | 11/1943 | Malek | 99—186 |
| 2,616,810 | 11/1952 | Gallenkamp | 99—186 |
| 2,686,130 | 8/1954 | Roberts | 99—186 |
| 2,785,070 | 3/1957 | Kester et al. | |
| 2,696,158 | 12/1954 | Shuman et al. | 99—221 X |

FOREIGN PATENTS 1,010,854   11/1965   Great Britain.

TIM R. MILES, Primary Examiner

U.S. Cl. X.R.

99—186

UNITED STATES PATENT OFFICE
CERTIFICATE OF CORRECTION

Patent No. 3,532,508            Dated October 6, 1970

Inventor(s) Mariette Ott

It is certified that error appears in the above-identified patent and that said Letters Patent are hereby corrected as shown below:

Column 1, line 72, "accordance" should read --according--.

Column 2, line 37, "soybean" should read --soyabean--.

Column 3, line 73 through line 74 delete "Continuation of heating...during cooling may" inclusive and insert in place thereof --Continuation of the rotation during the continuation of heating necessary for sterilisation of the contents of the cans and during cooling may--.

Column 4, line 29, "occational" should read --occasional--.

Column 6, line 20 (Claim 8), "rise" should read --rice--.

SIGNED AND
SEALED
DEC 29 1970

(SEAL)
Attest:

Edward M. Fletcher, Jr.
Attesting Officer

WILLIAM E. SCHUYLER, JR.
Commissioner of Patents